United States Patent [19]
Schmalfeld et al.

[11] 3,804,581
[45] Apr. 16, 1974

[54] PROCESS OF THERMALLY TREATING FINE-GRAINED SOLIDS IN AN INTERNALLY HEATED FLUIDIZED BED

[75] Inventors: Paul Schmalfeld, Bad Homburg; Burkhard Bock, Duisburg; Hans-Dieter Schilling, Essen, all of Germany

[73] Assignees: Metallgesellschaft Aktiengesellschaft, Frankfurt am Main; Bergwerksverband GmbH, Essen-Kray, both of, Germany

[22] Filed: Dec. 13, 1971

[21] Appl. No.: 207,193

[30] Foreign Application Priority Data
Dec. 16, 1970 Germany.......................... 2061829

[52] U.S. Cl.................... 432/58, 432/15, 34/10, 34/57 R, 34/57 A, 75/9
[51] Int. Cl............................................ F26b 17/00
[58] Field of Search............ 263/21 A; 34/10, 57 R, 34/57 A; 432/58, 15; 75/9, 26

[56] References Cited
UNITED STATES PATENTS
| | | | |
|---|---|---|---|
| 2,666,269 | 1/1954 | Parry | 34/10 |
| 3,306,236 | 2/1967 | Campbell | 4/57 A |
| 3,611,585 | 10/1971 | Nava | 4/57 A |
| 3,511,616 | 5/1970 | Steever | 75/9 |
| 3,578,798 | 5/1971 | Lapple | 432/58 |
| 2,184,300 | 12/1939 | Hodson et al. | 432/122 |
| 3,661,558 | 5/1972 | Heath et al. | 263/21 A |
| 2,619,451 | 11/1952 | Ogoraly et al. | 263/21 A |
| 2,184,300 | 12/1939 | Hodson et al. | 263/21 A |
| 1,667,666 | 4/1928 | Koon | 34/10 |
| 2,607,666 | 8/1952 | Martin | 263/21 A |

FOREIGN PATENTS OR APPLICATIONS
787,292   12/1957   Great Britain...................... 432/58

Primary Examiner—John J. Camby
Assistant Examiner—Henry C. Yuen
Attorney, Agent, or Firm—Burgess, Dinklage & Sprung

[57] ABSTRACT

Granular solids are thermally treated in a fluidized bed utilizing internal combustion. The process is carried out in such a way that the hot load can be varied independently of other operating conditions by supplying at least one third of the air supplied to the fluidized bed as secondary air which is fed to the upper half of the height of the fluidized bed below the top level thereof.

12 Claims, 2 Drawing Figures

PROCESS OF THERMALLY TREATING FINE-GRAINED SOLIDS IN AN INTERNALLY HEATED FLUIDIZED BED

BACKGROUND

This invention relates to a process for thermally treating fine-grained solids in a fluidized bed, wherein the heat required is supplied by the air supported combustion of substances which are contained in or supplied to the fluidized bed and at least part of the air which supports this combustion is used to maintain the bed in a fluidized state. This mode of operation will be referred to hereinafter as internal combustion.

In the thermal treatment of incombustible substances in a fluidized bed it is known to supply air, which also serves as a carrier gas for maintaining the bed in a fluidized state, and suitable fuels, which are preferably gaseous or liquid.

In a known mode of operation, the air is supplied from below through openings or nozzles provided in the reactor bottom whereas the fuel is supplied to the fluidized bed by feed inlets which extend laterally through the reactor wall.

It is also known to provide two sets of nozzles in the reactor bottom and to use the nozzles of one set to supply air and the nozzles of the other set to supply fuel.

Published German Patent Applications 1,758,244 and 1,943,752 describe apparatus for the joint and simultaneous supply of air and fuel through the bottom of a fluidized-bed reactor which comprises a number of individual nozzles each of which is provided with concentric conduits to supply air and fuel, respectively. It is also known to supply air and fuel to a fluidized bed of inert substances and to initiate an afterburning in the exhaust gases from the thermal treatment by jets of additional air which is injected above the top level of the fluidized bed.

If the substances which are to be heat-treated are combustible, the heat required for the thermal treatment may be supplied by a partial combustion of these substances. In some cases, e.g., during a low-temperature carbonization or coking of fine-grained coal, such partial combustion is undesirable because it results in an unnecessary increase in the ash content of the product coke whereas the combustible gases and vapors escaping during the thermal treatment are burnt outside the fluidized-bed reactor. For this reason, in these cases the heat required for the thermal treatment is often also supplied by a combustion of fuel which has been supplied to the fluidized bed from the outside, and the combustible gases and vapors which escape during the low-temperature carbonization or coking are used as fuel as far as possible.

For the operation of a fluidized-bed reactor, gas at or above a minimum rate must be supplied as a carrier gas through the reactor bottom in order to maintain the fine-grained substance in a fluidized state. If the fluidized-bed reactor is to be operated with internal combustion, the oxygen requirement of the combustion reaction must be taken into consideration in the selection of the rate of carrier gas and in the design of the reactor. A large share of the cost of fluidized-bed reactors is accounted for by the reactor bottom because the same must resist high temperatures. For this reason, the bottom diameter of the reactor is minimized and the gas is caused to flow at a velocity which is as high as possible. To enable to selection of a carrier gas inlet velocity which is as high as possible and to reduce the velocity of the carrier gas at the outlet on the top level of the fluidized bed to such an extent that substantially no fine-grained solids are entrained, the shell of the reactor flares upwardly in conical shape. That design is really only useful in reactors which are small in diameter (1–3 meters) and contain a fluidized bed having a height of 2–3 meters whereas it affords only a small advantage in reactors which are large in diameter (4–6 meters and more) and which have only a shallow bed 2 meters to 0.5 meter in height.

SUMMARY

It is an object of the invention to teach how a fluidized-bed reactor using internal combustion can be operated so that the heat load is variable independently of other operating conditions of the reactor.

This object is accomplished in that at least one-third of the air which is supplied to the fluidized bed is supplied to the upper half of the height of the bed below the top level of the fluidized bed. The upper half of the height of the bed is preferably supplied with air by a plurality of jets, which are tangent to an imaginary circle which is concentric to the reactor shell and which is suitably half as large in diameter as the fluidized bed. The jets are horizontal or have a slight downward inclination.

DESCRIPTION OF THE DRAWING

The invention will be more fully understood with reference to FIGS. 1 and 2.

DESCRIPTION

Figure 1:
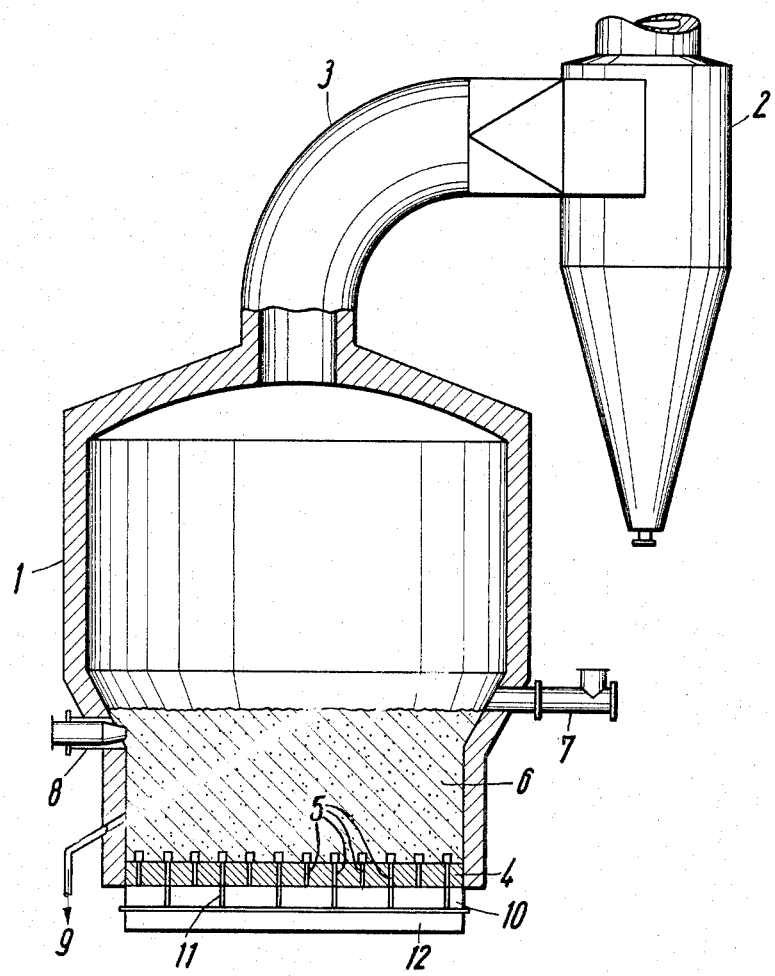
FIG. 1 shows a fluidized-bed reactor using internal combustion and succeeded by a cyclone.

Fuels in the form of dust, liquid or gas may also be supplied together with the air which is supplied to the upper half of the fluidized bed. For this purpose, the air and fuel may be mixed in chambers which precede the nozzles and may be partly burnt in said chambers. It has been found that the design and operation of fluidized-bed reactors using internal combustion may be much simplified and facilitated if the air which contains the oxygen used in producing the heat which is required for the thermal treatment is supplied at least in part as secondary air to the upper half. As a result, the streams of air which are supplied to the reactor as a carrier gas and combustion air, respectively, are mutually independent to such a degree that flow conditions in the fluidized bed will not be disturbed if the reactor is operated under partial load. For an operation under partial load, the secondary air may be throttled or shut off.

On the other hand, the air stream which is introduced through the reactor bottom and which contains carrier gas at the rate required to maintain a fluidized condition can usually be reduced by one-third or up to one-half and such reduction will not have an appreciable adverse effect on the flow in the fluidized bed. In this way the load on a fluidized-bed reactor using internal combustion may be reduced to only 25 percent of the normal load without the need for partial replacement of the air by inert gas or steam.

The work of compression which is required for the secondary air supplied to the upper half of the fluidized bed is much smaller than the work of compression required for the carrier gas which is introduced through the reactor bottom. The secondary air is supplied to the upper half of the fluidized bed directly below the top level of the bed through individual large nozzles, which are mounted on the reactor shell and extend horizontally or with a slight downward inclination and in directions which are tangential to a circle which is centered on the reactor axis and which is about half as large in diameter as the fluidized bed.

Fuel in the form of gas, liquid or dust may be supplied together with the secondary air through these nozzles. Because the air-fuel mixture emerges from the nozzles in the form of compact jets, the oxygen content of the secondary air is preferably consumed in this mixture and does not result in an appreciable attack on the combustible substance which is contained in the material which is fluidized. Besides, the fuel and air may be mixed and fired in combustion chambers which precede the nozzles so that a partly burnt, hot gas mixture flows from the nozzles into the fluidized bed.

It is suitable to provide before each nozzle a combustion chamber which is designed for a rate of $2-8 \times 10^6$, preferably $3-5 \times 10^6$, kcal/m$^3$h.

If the granular material which is to be thermally treated is not combustible, the air and fuel will be supplied through the nozzles in the reactor bottom and through the nozzles which discharge into the upper half of the fluidized bed. If the granular material to be treated contains a component which can be and should be burnt, it may be sufficient to supply only air through the reactor bottom and the secondary air nozzles. When a higher temperature should be maintained during the treatment, additional fuel may be supplied through the nozzles in the reactor bottom and/or the secondary air nozzles at the rate which is required to maintain the temperature needed for the treatment.

If the granular material to be thermally treated is coal or coke and should be subjected to a thermal treatment which results in a low-temperature carbonization, coking or gasification, it will be sufficient to supply the air which is required as a carrier gas to the fluidized bed through the reactor bottom. In this case, a small partial combustion of the coke must be tolerated. From the gases and vapors which escape during the coking treatment and which were previously subjected to hot dust collection and were then burnt under a steam boiler without interstage cooling, a partial stream can be branched off and can be recycled as a fuel to the upper half of the fluidized bed together with the secondary air. For this purpose, that partial stream after having been subjected to dust collection is cooled only to such an extent that it can be compressed by a blower-compressor to the inlet pressure of the secondary air. For this purpose a compression to 200–400 millimeters of water gauge is sufficient and may be effected in a blower which can readily be designed to operate at temperatures from 200–500°C. The gas is suitably cooled to the operating temperature of the blower by an injection of water. This mode of operation has a wide field of application in the production of fine coke for use as a leaning material or as a material which is to be briquetted or to be supplied as fuel to a sintering process. The coke is the main product in this case whereas the utilization of the volatile combustible products formed in the coking step is rather a burden from an economic aspect. It is an important advantage of the process according to the invention that these volatile combustible substances can be used as a fuel for the internal combustion and the yield of coke and the quality of the coke are improved because less coke is burnt.

Referring now to the drawing, a fluidized-bed reactor is shown in vertical sectional in FIG. 1 and includes a reactor body 1, which is provided with a gas exhaust pipe 3 leading to a cyclone 2 and with a bottom 4 for the fluidized bed. The carrier gas, such as air, and/or fuel, e.g., a fuel gas, are supplied to the fluidized bed 6 through nozzles 5 inserted in the reactor bottom. The granular material which is to be treated is supplied into the reactor by metering screw feeders 7, which are spaced around the periphery of the reactor and one of which is shown. These feeders may be disposed slightly above the fluidized bed, as is shown here, or in the upper half of the fluidized bed. The treated material is removed by discharge devices 9, only one of which is shown. Nozzles 8 are provided in the reactor shell in the upper half of the height of the fluidized bed. These nozzles 8 are disposed below the top level of the fluidized bed and extend suitably in directions which are tangential to a circle which is centered on the axis of the reactor. These nozzles 8 serve to supply the secondary air and may have a slight downward inclination. The nozzles may consist of two-flud nozzles so that they may be used to supply secondary air and any fuel which is required. The nozzles are designed so that the secondary air and any auxiliary fuel enter the fluidized bed in the form of compact jets. Only one of these nozzles is shown, which are regularly spaced around the periphery of the reactor.

Part of the nozzles 5 inserted in the fluidizing bottom 4 may be used to supply the air and part of them may be used to supply fuel. In this case, part of the nozzles 5 extending through the reactor bottom are connected to the air manifold 10, which is disposed below the nozzles and may consist, e.g., of an air receiver. Other nozzles 5 may be connected by pipes 11 extending through the air receiver to a fuel manifold 12, which consists of a chamber that underlies the air receiver.

The nozzles 5 may suitably consist of two-fluid nozzles for fluidized-bed reactors. Such two-fluid nozzles have been mentioned above and described in the published German Patent Applications 1,758,244 and 1,943,752.

Figure 2:
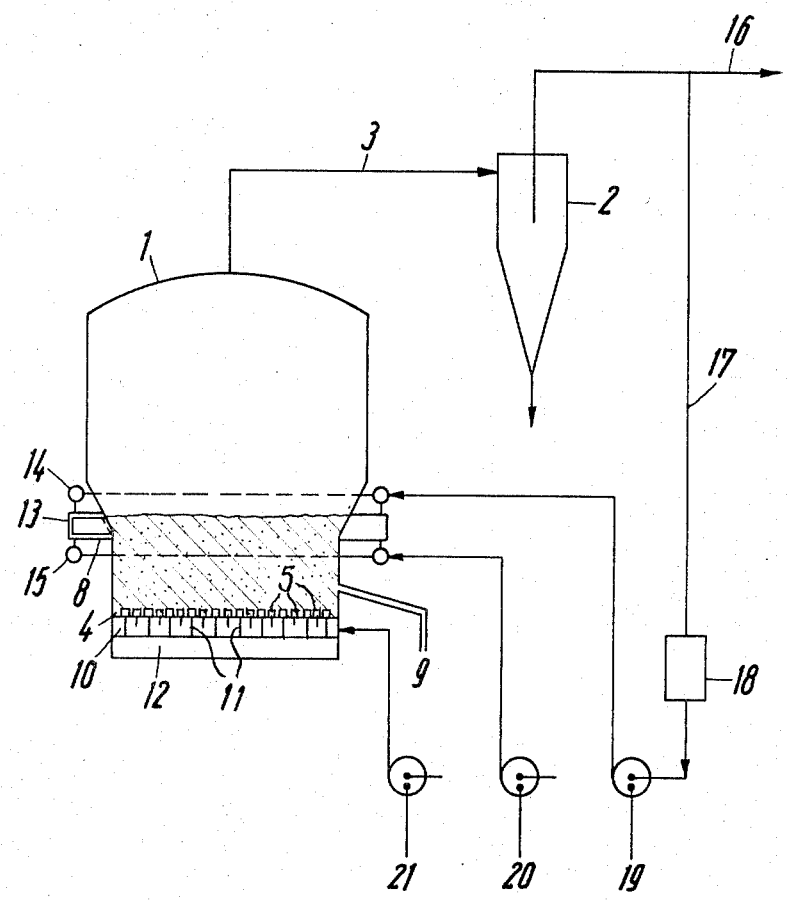
FIG. 2 is a flow scheme illustrating a fluidization process which is carried out in a fluidized-bed reactor provided with means for a supply of air and fuel and for a recycling of exhaust gases from the reaction as a fuel.

FIG. 2 shows the flow scheme of a plant for a degasification of coal in a fluidized-bed reactor where the reactor is similar to a large extent to that shown in FIG. 1 and like parts are provided with like reference numbers. One difference are combustion chambers 13 that precede the nozzles 8 through which the secondary air is supplied. Fuel and secondary air are supplied to the combustion chambers 13 by annular conduits 14 and 15 which incircle reactor 1. The coal to be degasified is supplied to the fluidized bed in the reactor 1 by metering screw feeders, which are not visible in the sectional view and correspond to the feeder 7 in FIG. 1. The coke which has been produced is removed from the fluidized bed above the reactor bottom by a discharge device 9. Air and fuel from the manifolds 10 and 12 are introduced through the reactor bottom by the nozzles 5 into the fluidized bed. The combustion gas formed at the mouths of the nozzles is a carrier gas for the fluidized bed and a heat carrier for the degasification. A partly burnt, hot mixture which has been produced in the combustion chambers 13 from secondary air from conduit 15 and fuel from conduit 14 is blown from nozzles 8 in the form of strong jets into the upper half of the fluidized bed. The resulting exhaust gas from the reactor has a low tar content and is supplied in conduit 3 to the cyclone 2, in which dust is collected from the mixture.

Part of the still hot gas from which dust gas been collected is conducted by the conduit 16 to a utilizing means and is, e.g., burnt in a steam boiler, which is not shown. The other part is conducted in conduit 17 through a spray cooler 18 and is cooled therein to a temperature of about 200–400°C, which can be tolerated by the succeding blower.

The fuel gas is compressed in the blower 19 to a pressure of 400 millimeters of water gauge and is then supplied to the combustion chambers 13 via annular conduit 14.

The blower 20 serves for a compression of the secondary air and the blower 21 for a supply of air to the nozzles 5.

The gas from which dust has been collected in the cyclone 2 may be passed through a known tar-condensing means, in which the gas is cooled approximately to the ambient temperature.

The process according to the invention will be explained more fully and by way of illustration in the following examples which are not intended to limit the invention in any way.

EXAMPLE 1

The fluidized-bed reactor shown in FIG. 1 may well be used to heat incombustible, inert materials, such as sand, lime, dolomite and the like, by an internal combustion using air and supplied fuel. For this purpose, sand having preferably a particle size range of 0.5–2 millimeters is supplied by the metering screw feeder 7 into the fluidized bed 1 at a rate of, e.g., 50 metric tons per hour. In the fluidized bed 1, the sand is heated, e.g., to 800°C. The heated sand is discharged through the valve-controlled horizontal discharge pipe 9 disposed on the opposite side 7. The fluidized bed is defined by a structure having an inside diameter of 2.6 meters in the lower part and an inside diameter of 4.0 meters in the upper part. The lower part is cylindrical in a height of 0.6 meter and is connected to the upper part by a transitional part, which is inclined 60° from the horizontal. Air at a rate of 9,000 standard cubic meters per hour from the air manifold 10 is fed to nuzzles 5 and fuel oil at a rate of 800 kilograms from the fuel manifold 12 are supplied through the pipes 11 to nozzles 5. At the same time, air at a rate of 6,000 standard cubc meters per hour and fuel oil at a rate of 500 kilograms per hour are supplied through four nozzles 8 provided at the periphery. The nozzles 8 are suitably spaced 0.7 meter above the fluidizing bottom and a height of 1.0 meter of the fluidized bed should be maintained.

EXAMPLE 2

FIG. 2 shows a fluidized bed in which the top air is supplied through preceding combustion chambers 13. This fluidized bed is particularly suitable for a degasification and coking of fine-grained coals with a minimum partial combustion of coke. Suitably predried coal having a particle size of 0–3 millimeters is supplied to the fluidized bed continuously at a rate of 60 metric tons per hour. Fine-grained coke produced from the coal is fluidized in the fluidized bed an is heated therein to a temperature of 750°C and degasified at the same time. Hot coke is continuously removed through the discharge pipe 9 at such a rate that a height of 1.2 meters of the fluidized bed is maintained.

The fluidized bed is 5.0 meters in diameter in its lower part and 7.5 meters in diameter in its upper part. Air at a rate of 16,000 standard cubic meters per hour is supplied to manifold 10 through the bottom nozzles 5 and coke-oven gas having a net calorific value of 4,200 kcal per standard cubic meter is supplied to manifold 12 through the pipes 11 to nozzles 5 at the same time. Eight combustion chambers 13 are supplied from the annular conduit 14 with air at a rate of 11,000 standard cubic meters per hour and from the annular conduit 15 at a rate of 10,000 cubic meters per hour with moist gas which has a calorific value of 1,300 kcal per standard cubic meter of moist gas and which has been compressed in the blower 19. The air and coke-oven gas are intensely mixed in the two-fluid nozzles 5 and are jointly burnt preferentially in the lower part of the fluidized bed whereas the fluidized coke is not appreciably burnt. The preliminary combustion in the combustion chamber 13 results in a preferential combustion of the gas-air mixture which has been supplied to said chamber. As a result, the loss of coke by combustion is small and the coke forming the main product can be obtained in a high yield. If the fluidized bed has a height of 1.2 meters, the axis of the combustion chambers 13 is suitably spaced 0.8 meter above the fluidizing bottom.

What is claimed is:

1. In a process for producing coke by thermally treating and degasifying fine-grained coal in a fluidized bed having a bottom from which air and fuel and combustion gases thereof are supplied to said fluidized bed as a carrier gas for the fluidized bed and a heat carrier for degasification, the improvement which comprises supplying part of the air as secondary air to the upper half of the height of the fluidized bed below the top level thereof, withdrawing a partial stream of the exhaust gases from said fluidized bed, cooling said partial stream to about 200°–400°C., partly combusting the cooled exhaust gases with said secondary air outside of said fluidized bed and thereafter feeding the combustion gases thereof together with uncombusted exhaust gases and secondary air into the fluidized bed.

2. Process of claim 1 wherein the combustion gases together with uncombusted exhaust gases and secondary air are supplied to said fluidized bed in a plurality of streams spaced about the periphery of said fluidized bed.

3. Process of claim 2 wherein said streams are introduced tangential to the circle concentric with the fluidized bed.

4. Process of claim 3 wherein said circle is half as large in diameter as the fluidized bed.

5. Process of claim 3 wherein said streams are horizontally or inclined slightly downward with respect to said fluidized bed.

6. Process of claim 2 wherein said streams spaced about the periphery of said fluidized bed are in communication with combustion chambers and annular conduits feed the cooled exhaust gases and the secondary air thereto for partial combustion therein.

7. In a fluidized bed reactor for thermally treating and degasifying fine-grained coal having fluidized bed means with bottom means with means for supplying air and fuel and combustion gases thereof therefrom as a carrier gas for the fluidized bed and as a heat carrier for degasification, the improvement which comprises means for supplying part of the air as a secondary air to the upper half of the height of the fluidized bed means below the top level thereof, means for withdrawing a partial stream of the exhaust gases from said fluidized bed, means for cooling said withdrawn partial stream to about 200°–400°C., means for partly combusting the cooled exhaust gases with said secondary air outside of said fluidized bed means and means for feeding the combustion gases thereof together with uncombusted exhaust gases and secondary air into the fluidized bed means.

8. Fluidized bed reactor of claim 7 wherein said means for feeding the combustion gases together with uncombusted exhaust gases and secondary air comprises a plurality of jets spaced about the perimeter of said reactor.

9. Reactor of claim 8 wherein said jets are tangential to a circle concentric with the reactor.

10. Reactor of claim 9 wherein said circle is half as large in diameter as the diameter of the reactor.

11. Reactor of claim 8 wherein said jets are horizontal or inclined slightly downward with respect to said reactor.

12. Reactor of claim 7 which includes means for mixing said secondary air with fuel and partly combusting said mixture prior to entering said fluidized bed.

* * * * *